(12) United States Patent
Hawkes et al.

(10) Patent No.: US 8,365,755 B2
(45) Date of Patent: Feb. 5, 2013

(54) BALL VALVE ISOLATOR

(75) Inventors: Stephen Robert Hawkes, Staffordshire (GB); Richard Edwards, Warwickshire (GB)

(73) Assignee: Norgren Limited, Staffordshire (GB)

(*) Notice: Subject to any disclaimer, the term of this patent is extended or adjusted under 35 U.S.C. 154(b) by 424 days.

(21) Appl. No.: 12/672,971

(22) PCT Filed: Aug. 23, 2007

(86) PCT No.: PCT/GB2007/003219
§ 371 (c)(1),
(2), (4) Date: Feb. 10, 2010

(87) PCT Pub. No.: WO2009/024735
PCT Pub. Date: Feb. 26, 2009

(65) Prior Publication Data
US 2011/0266480 A1 Nov. 3, 2011

(51) Int. Cl.
*F16K 43/00* (2006.01)
(52) U.S. Cl. .............. 137/15.18; 137/315.21; 137/613; 137/627.5
(58) Field of Classification Search .......... 137/613, 137/628, 627.5, 884, 315.21, 15.18, 15.22; 251/217, 218, 367, 315.1
See application file for complete search history.

(56) References Cited

U.S. PATENT DOCUMENTS

| | | | | |
|---|---|---|---|---|
| 1,002,463 A * | 9/1911 | Spellmeyer | .................... | 137/613 |
| 1,717,425 A * | 6/1929 | Weaver | .......................... | 137/613 |
| 5,085,244 A | 2/1992 | Funk | | |
| 5,546,983 A | 8/1996 | Clare | | |
| 5,806,563 A * | 9/1998 | Rabby | ........................... | 137/613 |
| 6,681,802 B2 * | 1/2004 | McHugh | ........................ | 137/613 |
| 7,287,544 B2 * | 10/2007 | Seneviratne et al. | .......... | 137/613 |

FOREIGN PATENT DOCUMENTS

| | | |
|---|---|---|
| JP | 4362383 A | 12/1992 |
| JP | 2003322268 A | 11/2003 |
| WO | 01/38761 A1 | 5/2001 |
| WO | 02/21029 A1 | 3/2002 |

* cited by examiner

*Primary Examiner* — Craig M Schneider
*Assistant Examiner* — Craig J Price
(74) *Attorney, Agent, or Firm* — The Ollila Law Group LLC

(57) ABSTRACT

A ball valve isolator (5) includes a housing (15), a ball valve (60), a first isolator (40), and a second isolator (41). The housing (15) is provided with a first flow passage (29) located between an inlet (30) and an outlet (31). The ball valve (60) that includes a ball portion (63) located in the first flow passage (29) and defines a second flow passage (65) that is aligned with the first flow passage (29) when the ball valve (60) is actuated to an open position. The first isolator (40) is located, at least in part, within the housing (15) and substantially blocks the inlet (30) when the first isolator (40) is actuated to a closed position. The second isolator (41) is located, at least in part, within the housing (15) and substantially blocks the outlet (31) when the second isolator (41) is actuated to a closed position.

16 Claims, 4 Drawing Sheets

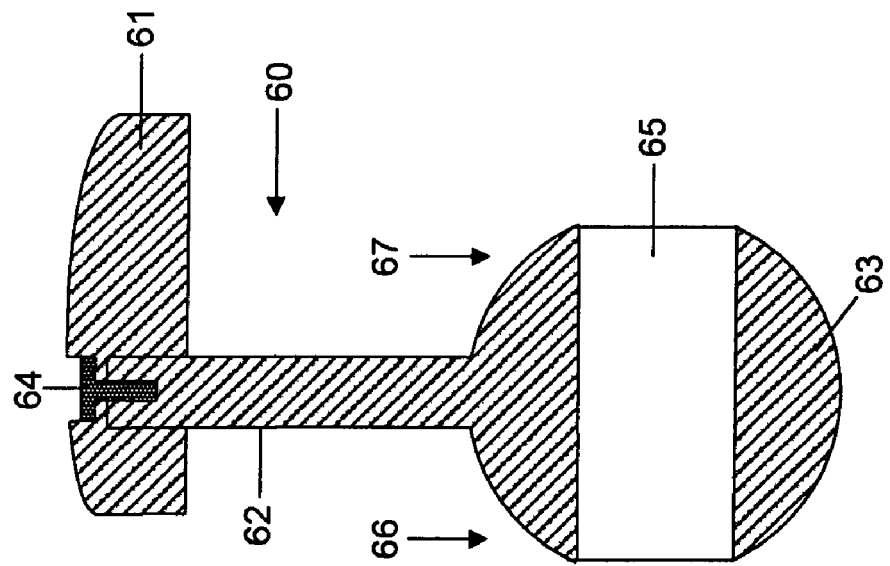
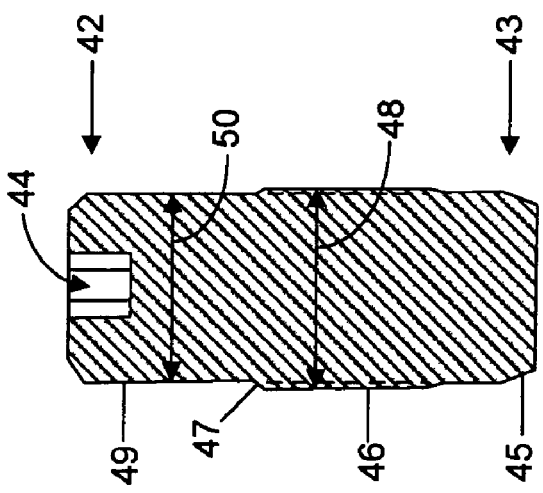
FIG. 4
FIG. 3

BALL VALVE ISOLATOR

FIELD OF THE INVENTION

The present invention relates to valves, and, particularly, in one embodiment, to a ball valve isolator that allows easier servicing of the ball valve.

BACKGROUND OF THE INVENTION

Ball valves are used in many applications to regulate the flow of a substance, such as gas or fluid. After a period of use, however, ball valves may need to be removed to be serviced or replaced. This may require shutting down the entire system which the ball valve is apart to prevent leakage of the substance when the ball valve is removed. In addition to being an inconvenience, in certain environments, such as a hospital setting, this may result in patients or doctors not having access to a gas. This presents a potentially dangerous situation and may require planning to ensure that alternative sources, such as portable tanks, are available to those who need them.

The present invention is directed to overcoming these and other disadvantages inherent in the prior art.

SUMMARY OF THE INVENTION

The scope of the present invention is defined solely by the appended claims, and is not affected to any degree by the statements within this summary.

In one embodiment of the present invention a ball valve isolator that includes a housing, a ball valve, a first isolator, and a second isolator. The housing is provided with a first flow passage located between an inlet and an outlet. The ball valve that includes a ball portion that is located in the first flow passage. The ball portion defines a second flow passage that is aligned with the first flow passage when the ball valve is actuated to an open position. The first isolator is located, at least in part, within the housing and substantially blocks the inlet when the first isolator is actuated to a closed position. The second isolator is located, at least in part, within the housing and substantially blocks the outlet when the second isolator is actuated to a closed position.

In another embodiment of the present invention a ball valve isolator includes a housing, a ball valve, a first isolator, a second isolator, a first O-ring, and a second O-ring. The housing is provided with a first flow passage, a first isolator accommodating passage, and a second isolator accommodating passage. An outer end of the first isolator accommodating passage is provided with a first counter bore and an outer end of the second isolator accommodating passage is provided with a second counter bore. The first flow passage is located between an inlet and an outlet. The first O-ring located within the first counter bore of the housing. The second O-ring located within the second counter bore of the housing. The ball valve includes a ball portion that is located in the first flow passage. The ball portion defines a second flow passage aligned with the first flow passage when the ball valve is actuated to an open position. The first isolator is located, at least in part, within the housing and includes a first sealing surface that substantially blocks the inlet when the first isolator is actuated to a closed position and a second sealing surface that cooperates with the first O-ring to seal a joint between the housing and the first isolator when the first isolator is actuated to an open position.

The second isolator is located, at least in part, within the housing. The second isolator includes a first sealing surface that substantially blocks the outlet when the second isolator is actuated to a closed position and a second sealing surface that cooperates with the second O-ring to seal a joint between the housing and the second isolator when the second isolator is actuated to an open position.

In another embodiment of the present invention, a method of removing a ball valve from a housing includes the steps of actuating a first isolator that is located, at least in part, within the housing into a closed position whereat the first isolator substantially blocks an inlet of the housing. Actuating a second isolator that is located, at least in part, within the housing into a closed position whereat the second isolator substantially blocks an outlet of the housing. Removing the ball valve that is located, at least partially, within the housing, wherein the ball valve, when located within the housing, is positioned, at least in part, within a flow passage located between the inlet and the outlet of the housing.

ASPECTS

According to an aspect of the present invention, a ball valve isolator comprises:

a housing provided with a first flow passage located between an inlet and an outlet;

a ball valve including a ball portion that is located in the first flow passage, wherein the ball portion defines a second flow passage that is aligned with the first flow passage when the ball valve is actuated to an open position;

a first isolator located, at least in part, within the housing, wherein the first isolator substantially blocks the inlet when the first isolator is actuated to a closed position; and a second isolator located, at least in part, within the housing, wherein the second isolator substantially blocks the outlet when the second isolator is actuated to a closed position.

Preferably, the housing is provided with a first isolator seat and a second isolator seat, the first isolator is provided with a first sealing surface that contacts the first isolator seat when the first isolator is actuated to a closed position, and the second isolator is provided with a first sealing surface that contacts the second isolator seat when the second isolator is actuated to a closed position.

Preferably, the housing is provided with a first isolator passage and a second isolator passage, wherein the first isolator passage is defined, at least in part, by a first threaded surface and the second isolator passage is defined, at least in part, by a second threaded surface, the first isolator is provided with a torque receiving surface and a threaded surface that mates with the first threaded surface of the housing, whereby the first isolator may travel within the housing, and the second isolator is provided with a torque receiving surface and a threaded surface that mates with the second threaded surface of the housing, whereby the second isolator may travel within the housing.

Preferably, the first and second isolators are provided with a generally cylindrical shape.

Preferably, a cover is secured to an end of the housing and defines a first isolator accommodating bore provided with a first diameter and a second isolator accommodating bore provided with a second diameter, wherein at least a portion of the first isolator is provided with a diameter that measures greater than the first diameter of the first isolator accommodating bore, whereby the cover, while secured to the housing prevents, at least a portion, of the first isolator from being removed from within the housing and at least a portion of the second isolator is provided with a diameter that measures greater than the second diameter of the second isolator accommodating bore, whereby the cover, while secured to the housing prevents, at least a portion, of the second isolator from being removed from within the housing.

Preferably, the ball valve is provided with an intermediate portion and a handle, wherein the intermediate portion connects the ball portion to the handle located outside the housing.

According to another aspect of the presently preferred embodiment, a ball valve isolator comprises:
  a housing provided with a first flow passage, a first isolator accommodating passage, and a second isolator accommodating passage, wherein:
    an outer end of the first isolator accommodating passage is provided with a first counter bore and an outer end of the second isolator accommodating passage is provided with a second counter bore;
    the first flow passage is located between an inlet and an outlet
  a first O-ring located within the first counter bore of the housing;
  a second O-ring located within the second counter bore of the housing;
  a ball valve including a ball portion that is located in the first flow passage, wherein the ball portion defines a second flow passage aligned with the first flow passage when the ball valve is actuated to an open position;
  a first isolator located, at least in part, within the housing, wherein the first isolator includes:
    a first sealing surface that substantially blocks the inlet when the first isolator is actuated to a closed position;
    a second sealing surface that cooperates with the first O-ring to seal a joint between the housing and the first isolator when the first isolator is actuated to an open position;
  a second isolator located, at least in part, within the housing, wherein the second isolator includes:
    a first sealing surface that substantially blocks the outlet when the second isolator is actuated to a closed position; and
    a second sealing surface that cooperates with the second O-ring to seal a joint between the housing and the second isolator when the second isolator is actuated to an open position.

Preferably, the housing is provided with a first isolator seat and a second isolator seat, the first isolator is provided with a first sealing surface that contacts the first isolator seat when the first isolator is actuated to a closed position, and the second isolator is provided with a first sealing surface that contacts the second isolator seat when the second isolator is actuated to a closed position.

Preferably, the housing is provided with a first isolator passage and a second isolator passage, wherein the first isolator passage is defined, at least in part, by a first threaded surface and the second isolator passage is defined, at least in part, by a second threaded surface, the first isolator is provided with a torque receiving surface and a threaded surface that mates with the first threaded surface of the housing, whereby the first isolator may travel within the housing, and the second isolator is provided with a torque receiving surface and a threaded surface that mates with the second threaded surface of the housing, whereby the second isolator may travel within the housing.

Preferably, the first and second isolators are provided with a generally cylindrical shape.

Preferably, a cover is secured to an end of the housing and defines a first isolator accommodating bore provided with a first diameter and a second isolator accommodating bore provided with a second diameter, wherein at least a portion of the first isolator is provided with a diameter that measures greater than the first diameter of the first isolator accommodating bore, whereby the cover, while secured to the housing prevents, at least a portion, of the first isolator from being removed from within the housing and at least a portion of the second isolator is provided with a diameter that measures greater than the second diameter of the second isolator accommodating bore, whereby the cover, while secured to the housing prevents, at least a portion, of the second isolator from being removed from within the housing.

Preferably, the ball valve is provided with an intermediate portion and a handle, wherein the intermediate portion connects the ball portion to the handle located outside the housing.

According to another embodiment of the present invention, a method of removing a ball valve from a housing comprises the steps of:
  actuating a first isolator that is located, at least in part, within the housing into a closed position whereat the first isolator substantially blocks an inlet of the housing;
  actuating a second isolator that is located, at least in part, within the housing into a closed position whereat the second isolator substantially blocks an outlet of the housing; and
  removing the ball valve that is located, at least partially, within the housing, wherein the ball valve, when located within the housing, is positioned, at least in part, within a flow passage located between the inlet and the outlet of the housing.

Preferably, further including the step of removing a cover secured to the housing, wherein the cover prevents removal of the ball valve from the housing when the cover is secured to the housing.

Preferably, the housing is provided with a first isolator seat and a second isolator seat, the first isolator is provided with a first sealing surface that contacts the first isolator seat when the first isolator is actuated to a closed position, and the second isolator is provided with a first sealing surface that contacts the second isolator seat when the second isolator is actuated to a closed position.

Preferably, the housing is provided with a first isolator passage and a second isolator passage, wherein the first isolator passage is defined, at least in part, by a first threaded surface and the second isolator passage is defined, at least in part, by a second threaded surface, the first isolator is provided with a torque receiving surface and a threaded surface that mates with the first threaded surface of the housing, whereby the first isolator may travel within the housing, and the second isolator is provided with a torque receiving surface and a threaded surface that mates with the second threaded surface of the housing, whereby the second isolator may travel within the housing.

Preferably, the first and second isolators are provided with a generally cylindrical shape.

Preferably, a cover is secured to an end of the housing and defines a first isolator accommodating bore provided with a first diameter and a second isolator accommodating bore provided with a second diameter, wherein at least a portion of the first isolator is provided with a diameter that measures greater than the first diameter of the first isolator accommodating bore, whereby the cover, while secured to the housing prevents, at least a portion, of the first isolator from being removed from within the housing and at least a portion of the second isolator is provided with a diameter that measures greater than the second diameter of the second isolator accommodating bore, whereby the cover, while secured to the housing prevents, at least a portion, of the second isolator from being removed from within the housing.

Preferably, the ball valve is provided with an intermediate portion and a handle, wherein the intermediate portion connects the ball portion to the handle located outside the housing.

BRIEF DESCRIPTION OF THE DRAWINGS

FIG. 3 depicts a sectional view of an isolator according to one embodiment.

FIG. 4 depicts a sectional view of a ball valve according to one embodiment.

DETAILED DESCRIPTION OF THE PRESENTLY PREFERRED EMBODIMENTS

Figure 1:
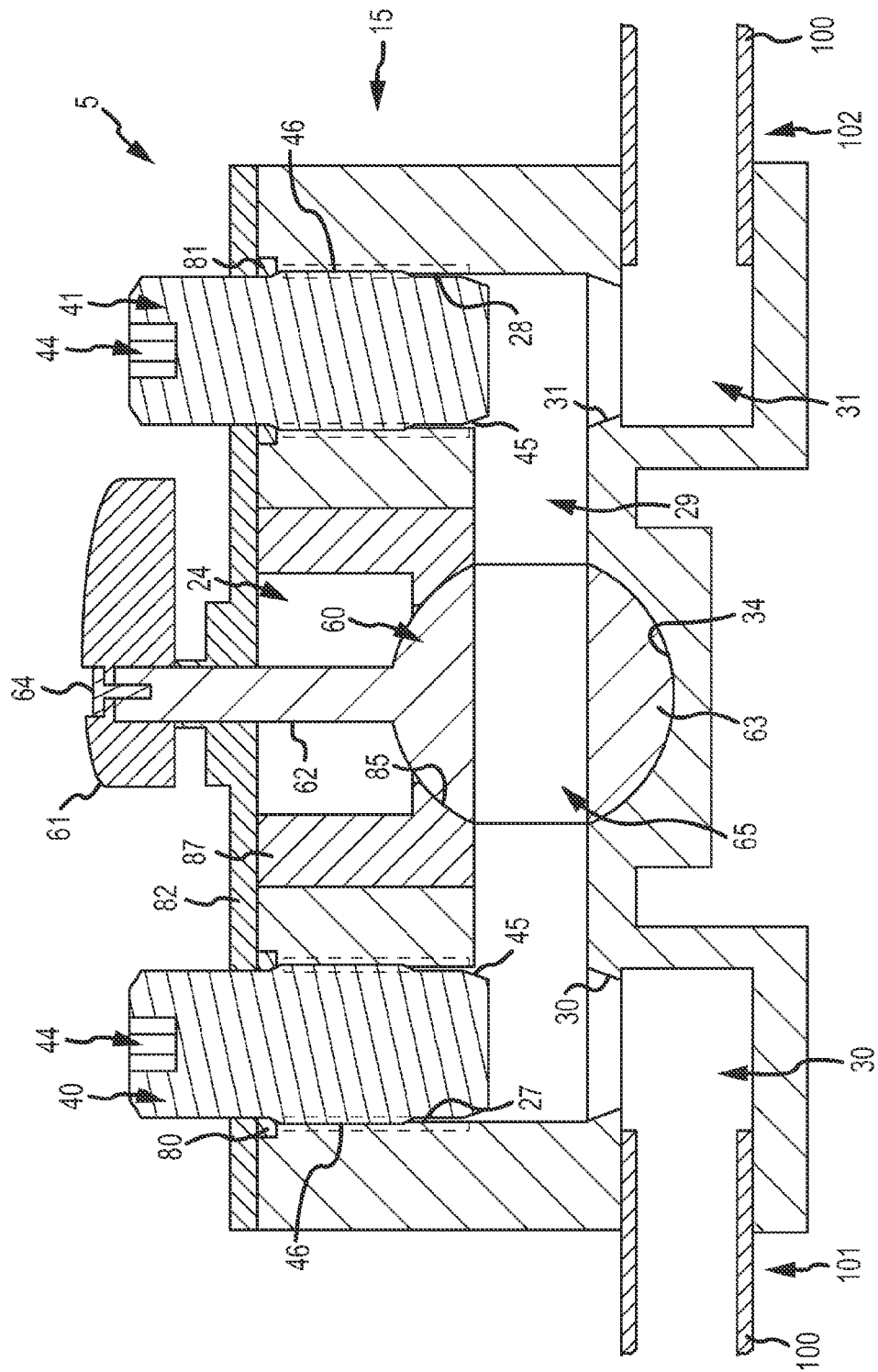
FIG. 1 depicts a sectional view of a housing, a first isolator, a second isolator, and a ball valve according to one embodiment.

FIG. 1 depicts one embodiment of a ball valve isolator 5. As shown therein, the ball valve isolator 5 includes a housing 15, a first isolator 40, a second isolator 41, and a ball valve 60.

Figure 2:
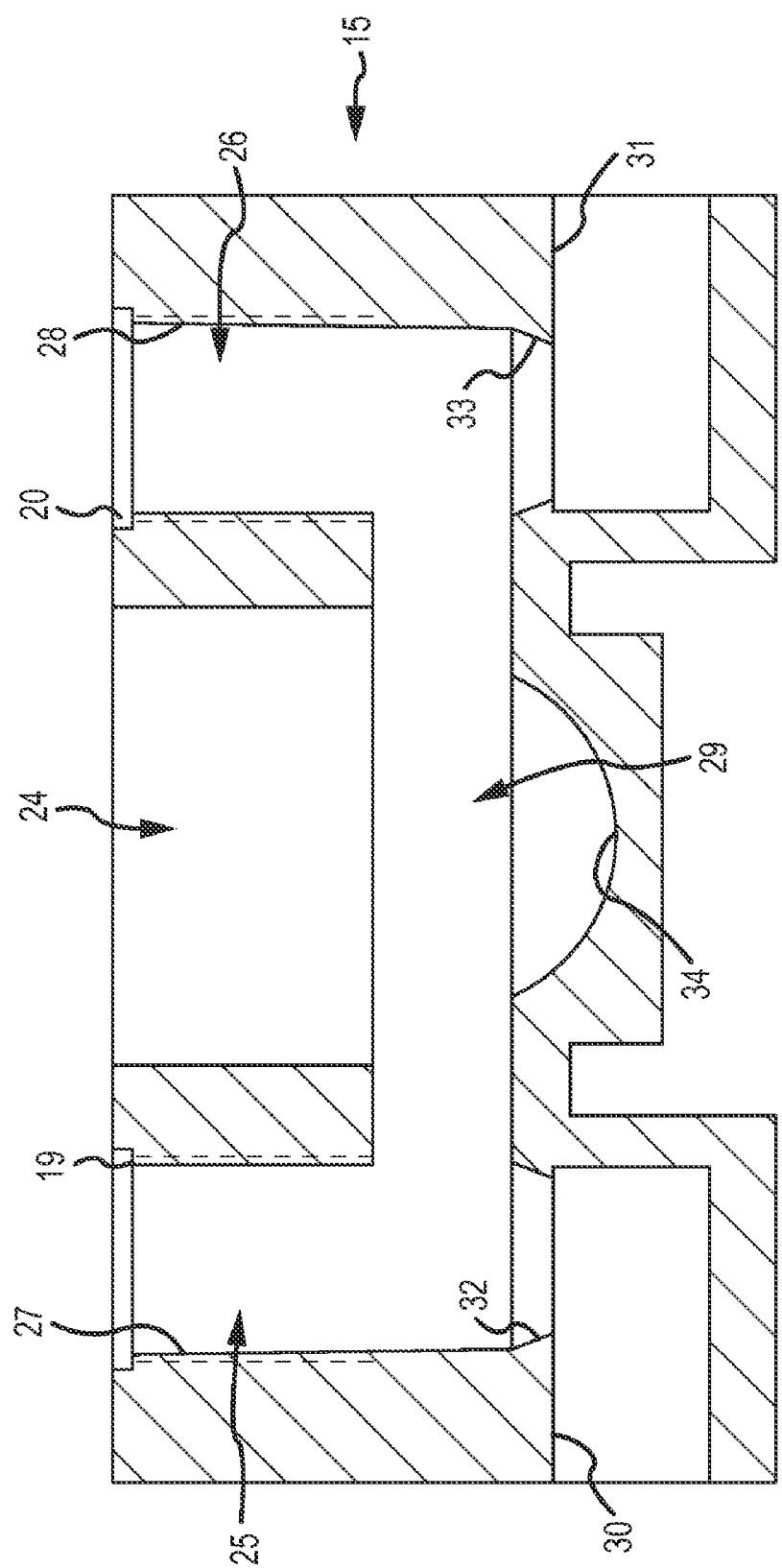
FIG. 2 depicts a sectional view of a housing according to one embodiment.

Turning now to FIG. 2, the housing 15 of one embodiment is depicted. As shown therein, the housing 15 defines a ball valve accommodating passage 24. According to an aspect of one embodiment, the ball valve accommodating passage 24 is dimensioned to receive a portion of the ball valve 60. According to another aspect of one embodiment, the ball valve accommodating passage 24 is dimensioned so that a ball portion 63 of the ball valve 60 may be positioned within a flow passage 29 defined by the housing 15.

According to yet another aspect of one embodiment, as shown in FIG. 1, the ball valve accommodating passage 24 is dimensioned to accommodate a sealing block 87. Within the scope of the present invention, the sealing block 87 may be integrally provided on a cover 82 or may be a separate structure as shown in FIG. 1. According to an aspect of one embodiment, the sealing block 87 prevents the ball valve 60 from moving within the housing 15. According to another aspect of one embodiment, the sealing block 87 is configured so that the ball portion 63 of the ball valve 60 may pivot within the housing 15. As shown in FIG. 1, the sealing block 87 is preferably provided with a bearing surface 85 that bears against a ball portion 63 of the ball valve 60.

According to another aspect of present embodiment, the sealing block 87 and the ball portion 63 cooperate so that a sealed joint is provided between the ball portion 63 and the sealing block 87. Those of ordinary skill in the art will appreciate that it is within the scope of the present invention to seal the joint between the sealing block 87 and the ball portion 63 via a number of arrangements. By way of example, and not limitation, the sealing block 87 and the ball portion 63 may be provided with a corresponding shape that seals the joint and/or an O-ring (not shown) may be used in sealing the joint.

In one embodiment, the housing 15 defines a first isolator accommodating passage 25 and a second isolator accommodating passage 26. According to an aspect of one embodiment, the first and second isolator accommodating passages 25, 26 are dimensioned to receive at least a portion of the first and second isolators 40, 41. In one embodiment, the isolator accommodating passages 25, 26 are defined at least in part by first and second threaded surfaces 27, 28. The first and second threaded surfaces 27, 28 are respectively configured to couple with threaded surfaces 46 provided on the respective first and second isolators 40, 41 of one embodiment.

As shown in FIG. 2, in one embodiment, the outer ends of the first and second isolator accommodating passages 25, 26 are preferably provided with respective counter bores 19, 20. As shown in FIG. 1, the counter bores 19, 20 are dimensioned to receive respective O-rings 80, 81. According to an aspect of one embodiment, the O-rings 80, 81 cooperate with the isolators 40, 41 to seal the joint between the isolators 40, 41 and the housing 15 when the isolators 40, 41 are actuated to an open position.

In one embodiment, the ball valve accommodating passage 24 and the first and second isolator accommodating passages 25, 26 extend from an end of the housing that receives a cover 82. Within the scope of the present invention, the cover 82 may be secured to the housing 15, such as, for example, and not limitation, by using threaded fasteners. Although in one embodiment, the ball valve accommodating passage 24 and the first and second isolator accommodating passages 25, 26 extend from the same end of the housing 15, it is within the scope of the present invention to extend one or more of the passages 24-26 from different ends of the housing 15.

Figure 5:
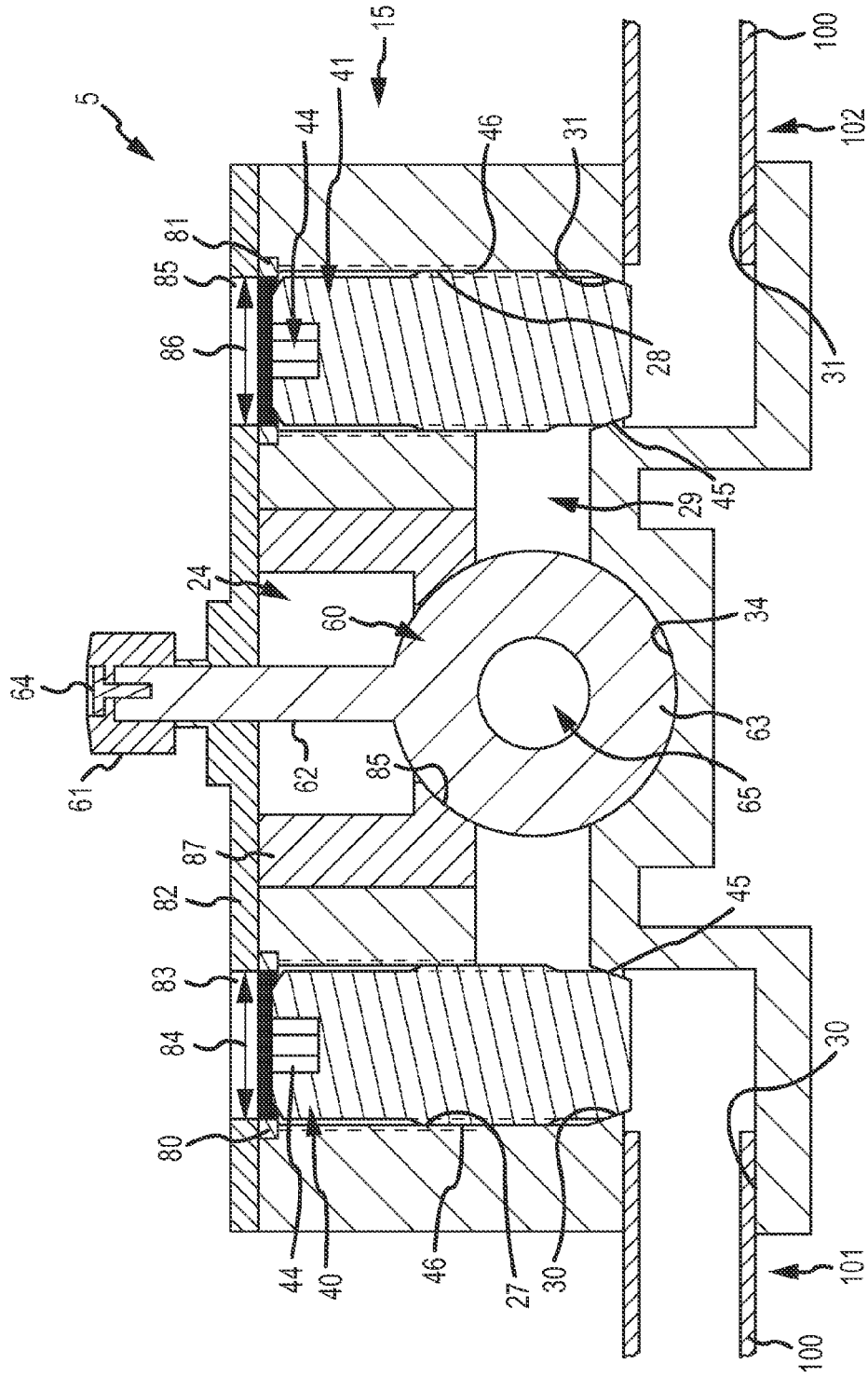
FIG. 5 depicts a sectional view of a housing, a first isolator, a second isolator, and a ball valve according to one embodiment.

As shown in FIG. 2, the housing 15 defines a flow passage 29. According to an aspect of one embodiment, the flow passage 29 allows a substance, such as a fluid or gas, to flow through the housing 15 when the first isolator 40, the second isolator 41, and the ball valve 60 is actuated to an open position, as shown in FIG. 1. According to another aspect of one embodiment, the flow passage 29 is configured so that the substance, such as a fluid or a gas, is substantially blocked from flowing through the flow passage 29 when the first isolator 40, the second isolator 41, or the ball valve 60 are actuated to a closed position, as shown in FIG. 5. According to another aspect of one embodiment, the flow passage 29 is configured so that the substance, such as a fluid or a gas, may be substantially blocked from flowing to the ball valve 60 when the first and second isolators 40, 41 are actuated to a closed position, as shown in FIG. 5.

As shown in FIG. 2, located within the flow passage 29 are first and second isolator seating surfaces 32, 33. According to an aspect of one embodiment, when the first and second isolators 40, 41 are actuated to a closed position, as shown in FIG. 5, the first and second isolator seating surfaces 32, 33 are configured to contact first sealing surfaces 45 on the respective first and second isolators 40, 41 to substantially block the flow of a substance, such as a fluid or a gas, that flows through the conduit 100. According to another aspect of one embodiment, when the first and second isolators 40, 41 are actuated to a closed position, as shown in FIG. 5, the first and second isolator seating surfaces 32, 33 are configured to contact first sealing surfaces 45 on the respective first and second isolators 40, 41 so that the substance, such as a fluid or a gas, may be substantially blocked from flowing to the ball valve 60. Advantageously, the ball valve 60 may be removed from the housing 15 when the first and second isolators 40, 41 are actuated to a closed position without shutting down the delivery system, such as a gas or fluid delivery system, which the conduit 100 is a part.

In one embodiment, an inlet 30 and an outlet 31 are located at opposite ends of the flow passage 29. The inlet 30 and the outlet 31 are configured so that the housing 15 may be connected, directly, as shown in FIG. 1, or indirectly, to ends 101, 102 of a conduit 100 containing a substance, such as a fluid or a gas, which flows through the flow passage 29.

As shown in FIG. 2, the flow passage 29 is also provided with a ball seat 34. According to an aspect of one embodiment, the ball portion 63 of the ball valve 60 bears against the ball seat 34 when installed in the housing 15. According to another aspect of one embodiment, the ball seat 34 is configured so that the ball portion 63 may pivot within the ball seat 34. According to yet another aspect of one embodiment, the ball seat 34 and ball portion 63 are configured so that a sealed joint exists between the ball portion 63 and the ball seat 34. Those of ordinary skill in the art will appreciate that it is within the scope of the present invention to seal the joint between the ball portion 63 and the ball seat 34 via a number of arrangements. By way of example, and not limitation, the ball portion 63 and the ball seat 34 may be provided with a corresponding shape that seals the joint and/or an O-ring (not shown) may be used in sealing the joint.

Turning now to FIG. 3, an isolator 40 or 41 of one embodiment is depicted. As shown therein, the first and second isolators 40, 41 are preferably with a generally cylindrical shape and are shown in the form of set screws, which are also known as grub screws.

Located at an outer end 42 of the first and second isolators 40, 41 is preferably a torque receiving surface 44. In one embodiment, the torque receiving surface 44 is an internal drive; however, in alternative embodiments, the torque receiving surface 44 may be an external drive.

According to an aspect of one embodiment, the first isolator 40 is configured to substantially block the inlet 30 when actuated to a closed position. According to another aspect of one embodiment, the second isolator 41 is configured to substantially block the outlet 31 when actuated to a closed position. In one embodiment, a first sealing surface 45 is preferably located at the inner end 43 of the isolators 40, 41. In one embodiment the first sealing surfaces 45 of the first and second isolators 40, 41 engage the respective isolator seats 32, 33 in the flow passage 29 to substantially block the flow of the substance flowing in the conduit 100. Although in one embodiment, the isolators 40, 41 substantially block the inlet 30 and the outlet 31 by exerting a clamping load on the isolator seats 32, 33 the isolators may substantially block the inlet 30 and the outlet 31 via other configurations, such as, for example, by plugging inlet 30 and outlet 31 without exerting a clamping load on the housing (15).

A second sealing surface 49 is preferably located at the outer end 42 of the isolators 40, 41. According to an aspect of one embodiment, the second sealing surfaces 49 on the first and second isolators 40, 41 are configured to cooperate with the respective O-rings 80, 81 to prevent leakage of the substance in the conduit 100 when the first and second isolators are not in the closed position. According to another aspect of one embodiment, the second sealing surfaces 49 of the first and second isolators 40, 41 are configured to provide a diameter 50 that measures less than first and second diameters 84, 86 defined within respective isolator accommodating bores 83, 85 defined by the cover 82. Accordingly, as shown in FIG. 1, the isolators 40, 41 may extend through the isolator accommodating bores 83, 85 when the isolators 40, 41 are actuated to an open position. In alternative embodiments; however, the diameter 50 may measure greater than the first and second diameters 84, 86 of the respective isolator accommodating bores 83, 85 of the cover 82, whereby the isolators 40, 41 may not extend therethrough.

As shown in FIG. 3, in one embodiment, a threaded surface 46 is located between the outer end 42 and the inner end 43 of the isolators 40, 41. According to an aspect of one embodiment, the threaded surfaces 46 on the first and second isolators 40, 41 mate with the respective first and second threaded surfaces 27, 28 in the respective isolator accommodating passages 25, 26 of the housing 15, whereby the isolators 25, 26 may travel within the isolator accommodating passages 25, 26. According to another aspect of one embodiment, the threaded surfaces 46 on the first and second isolators 40, 41 engage the respective first and second threaded surfaces 27, 28 in the respective isolator accommodating passages 25, 26 of the housing 15, whereby the first and second isolators may substantially block the inlet 30 and the outlet 31. According to yet another aspect of one embodiment, the threaded surfaces 46 on the first and second isolators 40, 41 engage the respective first and second threaded surfaces 27, 28 in the respective isolator accommodating passages 25, 26 of the housing 15, whereby the first and second isolators may substantially unblock the inlet 30 and the outlet 31 when the isolators 40, 41 are not in a closed position, such as while in the open position shown in FIG. 1.

As shown in FIG. 3, a shoulder 47 is preferably provided on the first and second isolators 40, 41. In one embodiment, the shoulder 47 is configured to prevent inadvertent removal of the isolators from the housing 15. In one embodiment, the shoulder 47 provides at least a portion of the first and second isolators 40, 41 with a diameter 48 that measures greater than the first and second diameters 84, 86 of the respective isolator accommodating bores 83 defined by the cover 82. Advantageously, in one embodiment, the shoulder 47 prevents at least a portion of the isolators 40, 41 from being removed from within the housing 15 while the cover 82 is secured to the housing 15; however, it is within the scope of the present invention for the isolators 40, 41 to be fabricated without the diameter 48, whereby the isolators 40, 41 may be removed from the isolator accommodating passages 25, 26 while the cover 82 is secured to the housing 15.

Turning now to FIG. 4, the ball valve 60 of one embodiment is depicted. In one embodiment, the ball valve 60 is provided with a handle 61 and a ball portion 63 connected via an intermediate portion 62. As shown, the handle 61 is preferably connected to the intermediate portion 62 via a threaded fastener 64, which in the presently depicted embodiment is provided with a male thread. In alternative embodiments, handle 61 may be connected via alternative means or may be integrally connected.

According to an aspect of one embodiment, as shown in FIG. 5, the ball portion 63 is configured to substantially block the flow of the substance in the conduit 100 from passing through the ball portion 63, when the ball valve 60 is in a closed position. According to another aspect of one embodiment, as shown in FIG. 1, the ball portion 63 is configured allow the substance in the conduit 100 to flow pass through the ball portion 63, when the ball valve 60 is actuated to an open position. Also shown in FIG. 1, the ball portion defines a second flow passage 65, which in one embodiment, extends from a first end 66 to a second end 67 of the ball portion 63. The second flow passage 65 is configured to allow the flow of the substance in the conduit 100 to pass through the ball valve 60 when the ball valve 60 is actuated to an open position, as shown in FIG. 1. As shown in FIG. 1, the second flow passage 65 is aligned with the first flow passage 29 when the ball valve 60 is actuated to an open position.

The present description depicts specific examples to teach those skilled in the art how to make and use the best mode of the invention. For the purpose of teaching inventive principles, some conventional aspects have been simplified or omitted. For example, those of ordinary skill in the art will appreciate that it is within the scope of the present invention to provide the ball valve isolator 5 with O-rings and gaskets, which although not shown, may be used to aid in the sealing of the ball valve isolator 5. Those skilled in the art will appreciate variations from these examples that fall within the scope of the invention. Those skilled in the art will appreciate that the features described above can be combined in various ways to form multiple variations of the invention. As a result, the invention is not limited to the specific examples described above, but only by the claims and their equivalents.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other embodiments and not just to the embodiments described above and shown in the accompanying figures. Accordingly, the scope of the invention should be determined from the following claims.

We claim:

1. A ball valve isolator (5), comprising:
    a housing (15) provided with a first flow passage (29) located between an inlet (30) and an outlet (31);
    a ball valve (60) including a ball portion (63) that is located in the first flow passage (29), wherein the ball portion (63) defines a second flow passage (65) that is aligned with the first flow passage (29) when the ball valve (60) is actuated to an open position;
    a first isolator (40) located, at least in part, within the housing (15), wherein the first isolator (40) substantially blocks the inlet (30) when the first isolator (40) is actuated to a closed position;
    a second isolator (41) located, at least in part, within the housing (15), wherein the second isolator (41) substantially blocks the outlet (31) when the second isolator (41) is actuated to a closed position; and
    a cover 82 that is secured to an end of the housing (15) and defines a first isolator accommodating bore (83) provided with a first diameter (84) and a second isolator accommodating bore (85) provided with a second diameter (86), wherein:
    at least a portion of the first isolator (40) is provided with a diameter (48) that measures greater than the first diameter (84) of the first isolator accommodating bore (83), whereby the cover (82), while secured to the housing (15) prevents, at least a portion, of the first isolator (40) from being removed from within the housing (15); and
    at least a portion of the second isolator (41) is provided with a diameter (48) that measures greater than the second diameter (86) of the second isolator accommodating bore (85), whereby the cover (82), while secured to the housing (15) prevents, at least a portion, of the second isolator (41) from being removed from within the housing (15).

2. The ball valve isolator (5) according to claim 1, wherein:
    the housing (15) is provided with a first isolator seat (32) and a second isolator seat (33);
    the first isolator (40) is provided with a first sealing surface (45) that contacts the first isolator seat (32) when the first isolator (40) is actuated to a closed position; and
    the second isolator (41) is provided with a first sealing surface (45) that contacts the second isolator seat (33) when the second isolator (41) is actuated to a closed position.

3. The ball valve isolator (5) according to claim 1, wherein:
    the housing (15) is provided with a first isolator passage (25) and a second isolator passage (26), wherein the first isolator passage (25) is defined, at least in part, by a first threaded surface (27) and the second isolator passage (26) is defined, at least in part, by a second threaded surface (28);
    the first isolator (40) is provided with a torque receiving surface (44) and a threaded surface (46) that mates with the first threaded surface (27) of the housing (15), whereby the first isolator (40) may travel within the housing (15); and
    the second isolator (41) is provided with a torque receiving surface (44) and a threaded surface (46) that mates with the second threaded surface (28) of the housing (15), whereby the second isolator (41) may travel within the housing (15).

4. The ball valve isolator (5) according to claim 1, wherein the first and second isolators (40, 41) are provided with a generally cylindrical shape.

5. The ball valve isolator (5) according to claim 1, wherein:
    the ball valve (6) is provided with an intermediate portion (62) and a handle (61), wherein the intermediate portion (62) connects the ball portion (63) to the handle (61) located outside the housing (15).

6. A ball valve isolator (5), comprising:
    a housing (15) provided with a first flow passage (29), a first isolator accommodating passage (25), and a second isolator accommodating passage (26), wherein:
        an outer end of the first isolator accommodating passage (25) is provided with a first counter bore (19) and an outer end of the second isolator accommodating passage (26) is provided with a second counter bore (20); and
        the first flow passage (29) is located between an inlet (30) and an outlet (31);
    a first O-ring (80) located within the first counter bore (19) of the housing (15);
    a second O-ring (81) located within the second counter bore (20) of the housing (15);
    a ball valve (60) including a ball portion (63) that is located in the first flow passage (29), wherein the ball portion (63) defines a second flow passage (65) aligned with the first flow passage (29) when the ball valve (60) is actuated to an open position;
    a first isolator (40) located, at least in part, within the housing (15), wherein the first isolator (40) includes:
        a first sealing surface (45) that substantially blocks the inlet (30) when the first isolator (40) is actuated to a closed position; and
        a second sealing surface (49) that cooperates with the first O-ring (80) to seal a joint between the housing (15) and the first isolator (40) when the first isolator (40) is actuated to an open position;
    a second isolator (41) located, at least in part, within the housing (15), wherein the second isolator (41) includes:
        a first sealing surface (45) that substantially blocks the outlet (31) when the second isolator (41) is actuated to a closed position; and
        a second sealing surface (49) that cooperates with the second O-ring (81) to seal a joint between the housing (15) and the second isolator (41) when the second isolator (41) is actuated to an open position; and
    a cover (82) that is secured to an end of the housing (15) and defines a first isolator accommodating bore (83) provided with a first diameter (84) and a second isolator accommodating bore (85) provided with a second diameter (86), wherein:
        at least a portion of the first isolator (40) is provided with a diameter (48) that measures greater than diameter (84) of the first isolator accommodating bore (83), whereby the cover (82), while secured to the housing

(15) prevents, at least a portion, of the first isolator (40) from being removed from within the housing (15); and at least a portion of the second isolator (41) is provided with a diameter (48) that measures greater than the second diameter (86) of the second isolator accommodating bore (85), whereby the cover (82), while secured to the housing (15) prevents, at least a portion, of the second isolator (41) from being removed from within the housing (15).

7. The ball valve isolator (5) according to claim 6, wherein:

the housing (15) is provided with a first isolator seat (32) and a second isolator seat (33);

the first isolator (40) is provided with a first sealing surface (45) that contacts the first isolator seat (32) when the first isolator (40) is actuated to a closed position; and the second isolator (41) is provided with a first sealing surface (45) that contacts the second isolator seat (33) when the second isolator (41) is actuated to a closed position.

8. The ball valve isolator (5) according to claim 6, wherein:

the housing (15) is provided with a first isolator passage (25) and a second isolator passage (26), wherein the first isolator passage (25) is defined, at least in part, by a first threaded surface (27) and the second isolator passage (26) is defined, at least in part, by a second threaded surface (28);

the first isolator (40) is provided with a torque receiving surface (44) and a threaded surface (46) that mates with the first threaded surface (27) of the housing (15), whereby the first isolator (40) may travel within the housing (15); and the second isolator (41) is provided with a torque receiving surface (44) and a threaded surface (46) that mates with the second threaded surface (28) of the housing (15), whereby the second isolator (41) may travel within the housing (15).

9. The ball valve isolator (5) according to claim 6, wherein the first and second isolators (40, 41) are provided with a generally cylindrical shape.

10. The ball valve isolator (5) according to claim 6, wherein:

the ball valve (6) is provided with an intermediate portion (62) and a handle (61), wherein the intermediate portion (62) connects the ball portion (63) to the handle (61) located outside the housing (15).

11. A method of removing a ball valve (60) from a housing (15), comprising the steps of:

actuating a first isolator (40) that is located, at least in part, within the housing (15) into a closed position whereat the first isolator (40) substantially blocks an inlet (30) of the housing (15);

actuating a second isolator (41) that is located, at least in part, within the housing (15) into a closed position whereat the second isolator (41) substantially blocks an outlet (31) of the housing (15);

removing a cover (82) secured to an end of the housing (15) and that defines a first isolator accommodating bore (83) provided with a first diameter (84) and a second isolator accommodating bore (85) provided with a second diameter (86), wherein at least a portion of the first isolator (40) is provided with a diameter (48) that measures greater than the first diameter (84) of the fist isolator accommodating bore (83) and whereby the cover (82), while secured to the housing (15), prevents at least a portion of the first isolator (40) from being removed from within the housing (15), and wherein at least a portion of the second isolator (41) is provided with a diameter (48) that measures greater than the second diameter (86) of the second isolator accommodating bore (85), whereby the cover (82), while secured to the housing (15), prevents at least a portion of the second isolator (41) from being removed from within the housing (15); and removing the ball valve (60) that is located, at least partially, within the housing (15), wherein the ball valve (60), when located within the housing (15), is positioned, at least in part, within a flow passage (29) located between the inlet (30) and the outlet (31) of the housing.

12. The method of removing a ball valve (60) from a housing (15) according to claim 11, further comprising the step of removing a cover (82) secured to the housing (15), wherein the cover (82) prevents removal of the ball valve (60) from the housing (15) when the cover (82) is secured to the housing (15).

13. The method of removing a ball valve (60) from a housing (15) according to claim 11, wherein:

the housing (15) is provided with a first isolator seat (32) and a second isolator seat (33);

the first isolator (40) is provided with a first sealing surface (45) that contacts the first isolator seat (32) when the first isolator (40) is actuated to a closed position; and the second isolator (41) is provided with a first sealing surface (45) that contacts the second isolator seat (33) when the second isolator (41) is actuated to a closed position.

14. The method of removing a ball valve (60) from a housing (15) according to claim 11, wherein:

the housing (15) is provided with a first isolator passage (25) and a second isolator passage (26), wherein the first isolator passage (25) is defined, at least in part, by a first threaded surface (27) and the second isolator passage (26) is defined, at least in part, by a second threaded surface (28);

the first isolator (40) is provided with a torque receiving surface (44) and a threaded surface (46) that mates with the first threaded surface (27) of the housing (15), whereby the first isolator (40) may travel within the housing (15); and the second isolator (41) is provided with a torque receiving surface (44) and a threaded surface (46) that mates with the second threaded surface (28) of the housing (15), whereby the second isolator (41) may travel within the housing (15).

15. The method of removing a ball valve (60) from a housing (15) according to claim 11, wherein the first and second isolators (40, 41) are provided with a generally cylindrical shape.

16. The method of removing a ball valve (60) from a housing (15) according to claim 11, wherein:

the ball valve (6) is provided with an intermediate portion (62) and a handle (61), wherein the intermediate portion (62) connects the ball portion (63) to the handle (61) located outside the housing (15).

* * * * *